(No Model.)

S. T. ESKEW.
HARROW.

No. 440,551. Patented Nov. 11, 1890.

Witnesses
Paul W. Stevens
Mercer Myers

Inventor
Samuel T. Eskew
By Myers & Co.
Attorneys

UNITED STATES PATENT OFFICE.

SAMUEL T. ESKEW, OF SUGAR VALLEY, GEORGIA.

HARROW.

SPECIFICATION forming part of Letters Patent No. 440,551, dated November 11, 1890.

Application filed June 30, 1890. Serial No. 358,996. (No model.)

*To all whom it may concern:*

Be it known that I, SAMUEL T. ESKEW, a citizen of the United States of America, residing at Sugar Valley, in the county of Gordon and State of Georgia, have invented certain new and useful Improvements in Harrows, of which the following is a specification, reference being had therein to the accompanying drawings.

My invention appertains to an improvement in combined cultivators and harrows; and it consists in the simple and novel construction of the parts, whereby the tooth-beams may be independently adjusted, as will more fully appear from the following description and accompanying drawings, in which—

Figure 1:
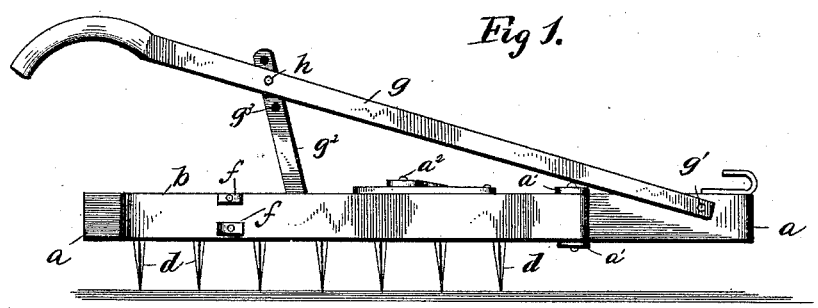
Figure 2:
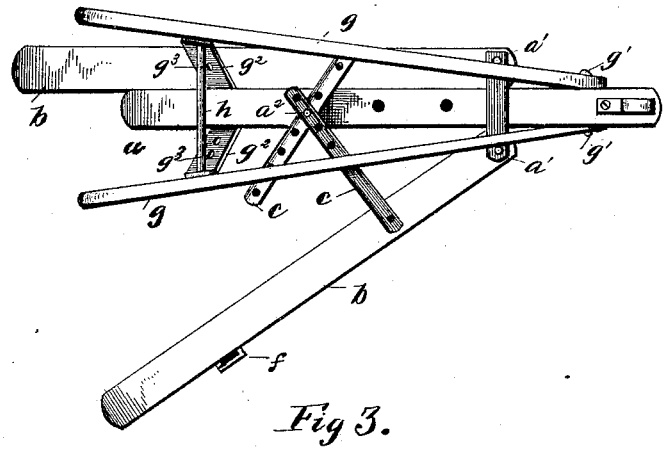
Figure 3:
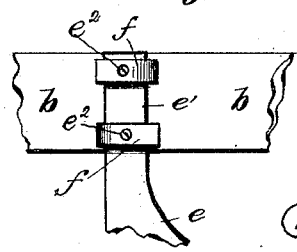

Figure 1 is a side elevation of my invention. Fig. 2 is a plan view thereof, and Fig. 3 is a detail view of one of the harrow-shovels and the means for securing it to the beams.

In the embodiment of my invention I employ a center bar or beam $a$, having pivoted thereto by means of strip $a'$ tooth-beams $b\,b$, designed to be swung outward therefrom at an angle. Beams $b\,b$ have pivoted thereto, about the center thereof, strips $c\,c$, having a series of orifices therein designed to align with one of a series of orifices in center beam $a$, through which orifices a pin or bolt $a^2$ is inserted to hold the beams $b\,b$ at the desired angle. Secured to beams $b\,b$ in any suitable manner are teeth $d\,d$. Secured at intervals on beams $b\,b$, when desired, are shovels $e\,e$, having a shank or arm $e'$, having orifices therein, said arm being designed to fit in two reversely-disposed L-shaped keepers $f$, having one end secured in the beams and their other arm or angle orificed to align with the orifices in the shovel, into which orifices a bolt or pin $e^2$ is inserted. Thus constructed it will be seen that the shovels $e^2$ can be readily adjusted in an elevated position to take them out of use, when desired, by withdrawing the lower pin $e^2$ and swinging the shovel out of its lower keeper and then re-inserting said pin, the shovel-shank being permitted to rest upon said pin; also, by means of the reversely-arranged L-shaped keepers $f$ the formation of openings or holes in the beams $b$ for the reception of the shanks of the plows or shovel is avoided, while two separate and independent points of bearing for said shanks are provided, as is obvious. Plow arms or handles $g\,g$ are pivoted at their forward ends at $g'$ to beam $a$ and extend rearwardly therefrom in an inclined position, where they are supported by means of vertical arms $g^2$, having orifices $g^3$ therein, through which and through corresponding orifices in the handles $g\,g$ a rod or bar $h$ is inserted, thus constructing the arms or handles so they may be adjusted to suit the height of the driver.

Having thus fully described my invention, what I claim, and desire to secure by Letters Patent, is—

In a combined harrow and cultivator, the combination, with the tooth-beams, of the keepers $f$ of L shape and reversely arranged with relation to each other and fastened to said beams, and the shovels having their shanks carried by said keepers, and pins or bolts engaging coincident openings or apertures in the keepers and said shanks, substantially as and for the purpose set forth.

In testimony whereof I affix my signature in presence of two witnesses.

SAMUEL T. ESKEW.

Witnesses:
F. L. HICKS,
L. R. PITTS.